United States Patent [19]

Groess et al.

[11] Patent Number: 4,505,639
[45] Date of Patent: Mar. 19, 1985

[54] AXIAL-FLOW TURBINE BLADE, ESPECIALLY AXIAL-FLOW TURBINE ROTOR BLADE FOR GAS TURBINE ENGINES

[75] Inventors: Helmut Groess, Esterhofen; Horst Graeml, deceased, late of Markt Indersdorf, both of Fed. Rep. of Germany, by Edith Graeml, administrator

[73] Assignee: MTU Motoren-Und Turbinen-Union Muenchen GmbH, Munich, Fed. Rep. of Germany

[21] Appl. No.: 477,171

[22] Filed: Mar. 21, 1983

[30] Foreign Application Priority Data

Mar. 26, 1982 [DE] Fed. Rep. of Germany ....... 3211139

[51] Int. Cl.³ .............................................. F01D 5/18
[52] U.S. Cl. .................................. 416/97 R; 415/115; 416/96 A
[58] Field of Search ............ 416/90 R, 91, 96 R, 416/96 A, 97 R, 224; 415/114, 115; 165/185, 146; 60/753

[56] References Cited

U.S. PATENT DOCUMENTS

| | | | |
|---|---|---|---|
| 3,540,811 | 11/1970 | Davis | 416/90 |
| 3,619,077 | 11/1971 | Wile et al. | 416/97 |
| 3,781,129 | 12/1973 | Aspinwall | 416/96 A |
| 4,183,716 | 1/1980 | Takahara et al. | 415/115 |
| 4,314,442 | 2/1982 | Rice | 416/97 R |

FOREIGN PATENT DOCUMENTS

| | | | |
|---|---|---|---|
| 1601561 | 12/1970 | Fed. Rep. of Germany . | |
| 1033589 | 7/1953 | France | 415/114 |
| 624939 | 6/1949 | United Kingdom | 60/753 |
| 1033759 | 6/1966 | United Kingdom | 416/97 |
| 565991 | 7/1977 | U.S.S.R. | 416/96 A |

Primary Examiner—Everette A. Powell, Jr.
Attorney, Agent, or Firm—W. G. Fasse; D. H. Kane, Jr.

[57] ABSTRACT

The present axial-flow turbine blade has two cooling channels extending radially through the blade. These radial channels communicate with each other through impingement cooling ducts or holes (3) extending substantially axially through the blade. One channel (1) supplies cooling fluid through the holes (3) into the other channel (2) which is located nearer the leading edge (8) of the blade and extends substantially in parallel to the leading edge (8). The cooling fluid impacts on the wall of the other channel (2) and is laterally blown out at a side wall of the blade. For optimal cooling, especially of the leading edge of the blade, which is subject to severe thermal loads, this edge is penetrated by cooling elements (4) in the form of pins or wires in axial alignment with the impingement cooling holes or ducts (3). These cooling pins or wires (4) reach into the channel (2) nearer the leading edge with their tapered end (5) and are made of a highly thermally conductive material. The second cooling channel (2) nearer the leading edge (8) may have different cross-sectional shapes, for example the shape may be at least partially rounded along circumferential wall sections, or it may be circular, elliptical, elongated or the like for an improved guiding of the cooling fluid such as air.

13 Claims, 7 Drawing Figures

AXIAL-FLOW TURBINE BLADE, ESPECIALLY AXIAL-FLOW TURBINE ROTOR BLADE FOR GAS TURBINE ENGINES

CLAIM TO PRIORITY

The present application is based on German patent application No. P 32 11 139.8-13, filed in the Federal Republic of Germany on Mar. 26, 1982. The priority of the German filing date is claimed for the present application.

BACKGROUND OF THE INVENTION

This invention relates to an axial-flow turbine blade, more particularly, to an axial-flow turbine rotor blade for gas turbine engines cooled by a cooling fluid such as compressor air flowing through several cooling fluid channels leading radially through the blade. Two cooling fluid channels communicate with each other through impingement cooling ducts, through which the cooling air fluid such as air entering the blade through the one channel is lead into the other channel nearer the leading edge of the blade for providing an impingement cooling. The cooling fluid is ejected from the other channel through lateral holes penetrating the wall of the blade at a slant or even tangentially.

German Patent Specification No. DE-AS 1,601,561 discloses such a turbine blade. In that turbine blade, a blade shell having a relatively thin wall completely encases several cooling channels which extend radially through the blade and communicate with each other through various ports or ducts. In this prior art blade the cooling air is admitted at the root end of the blade through a first radially extending channel and, from there, to a second air cooling channel through impingement air cooling ducts in a transverse wall, said second air channel extending essentially within the entire leading edge of the turbine blade. At the leading edge proper the blade shell has a relatively large number of radially and vertically staggered cooling air bleed holes for producing a cooling air film along the leading edge during operation. This arrangement provides a relatively good cooling of the leading edge of the blade, which during operation is exposed to high temperatures. However, the known structure does not exclude the risk that the minute leading edge cooling holes are blocked at least partially during long service. The holes can be blocked or clogged by, e.g., contaminations carried in the cooling medium or cooling air.

Another consideration in the manufacture of such blades is that making such small diameter holes e.g., by, electro erosive discharge machining, involves a considerable investment, especially if the required accurate inspection after manufacture is taken into account to make sure that these holes were actually completed to provide the specified flow cross-sectional areas.

It has also been shown that on such turbine blades, the impingement air cooling holes or ducts mentioned above are exposed to attack, e.g., by a hot gas corrosion, despite the described cooling provisions. Besides, the impingement cooling air holes or ducts are relatively difficult to inspect. Additionally, it is comparatively difficult to manufacture said impingement air cooling holes especially by electrochemical methods, because the need to guide the respective drilling tools through the air channels renders the drilling operation rather difficult and requires drilling tools of complex manufacture which additionally are difficult to handle.

Further, the known cooling methods for the blade require relatively high cooling air pressures and cooling air velocities involving considerable aerodynamic losses especially for the intended film cooling of the leading edge.

OBJECTS OF THE INVENTION

In view of the above it is the aim of the invention to achieve the following objects singly or in combination:

to avoid the disadvantages of the prior art by a cooled blade which assures an optimal cooling of the leading edge while alleviating the risk of wear and tear on the leading edge of the blade, which is subject to especially high thermal loads;

to avoid cooling holes in the leading edge of a turbine blade altogether so that the mentioned clogging may also be avoided;

to reduce corrosion which heretofore was caused by the cooling flow, especially as a hot gas corrosion;

to provide an optimal utilization of the available cooling surfaces of the cooling channel and of the cooling fluid;

to use the cooling fluid under a relatively low pressure and flow speed; and to provide the leading edge with a protective layer, which may also function as heat insulating layer for increasing the effectiveness of the cooling, especially in the leading edge where it is needed most.

SUMMARY OF THE INVENTION

In the turbine blade of the present invention the cooling medium such as air is admitted preferably at the root end of the blade and is first directed into a first cooling flow channel extending radially or longitudinally through the blade and it then reaches another also radially extending second cooling flow channel nearer the blade leading edge through impingement cooling ducts, whereby the cooling fluid exiting from the impingement ducts impinges on free ends of cooling elements in the form of pins or wires inserted in the leading edge of the blade. Preferably, the free ends of the cooling elements are tapered and provided with a rounded tip.

This tapering helps generate a considerable vortex motion which is distributed along the inner wall of the second cooling channel nearer the leading edge and then expelled through a row of bleed holes which are staggered in the radial direction and emerge preferably tangentially along the suction side of the blade.

In this arrangement especially the air duct nearer the leading edge has at least partially rounded circumferential portions forming, for example, an elongated cross-section or a cylindrical or circular section to ensure proper distribution and deflection of the cooling fluid in the leading edge area in cooperation with the respective wire or pin tips of the cooling elements. Said cooling channels or ducts can be manufactured by an electrochemical process. However, as far as the first and second cooling channels are concerned which communicate with each other through impingement cooling holes or ducts, they may also be produced already with the casting of the blade blank.

It is an especially advantageous aspect of the present invention that the holes in the leading edge area for receiving the cooling elements are drilled in a single pass together with the impingement cooling holes or ducts by, e.g., an electrochemical drilling method. Before the cooling elements in the form of wires or pins are inserted in their respective holes, the impingement holes or ducts can be inspected visually from the leading edge. Such visual inspection is simple and enhances the production.

The cooling elements in the form of wires or pins are optionally tapered at their one end by an etching process to provide a cone shape preferably with a rounded tip. These elements are made of thermally highly conductive material, such as a copper alloy, which ensures a selective and maximally rapid transfer of heat from the leading edge, which is subject to high temperatures, towards the second cooling channel nearer the leading edge of the blade, whereby the heat is taken up especially by the intensively swirled cooling fluid such as air in this second cooling channel.

For improved thermal insulation a protective layer is deposited on the leading edge of the blade by spraying. In this manner, the high-temperature brazing solder or alloy used for securing the pins or wires in place, is also protected against hot gas corrosion or erosion. A material suited for this purpose of forming the protective layer is: Circonium oxide, preferably yttrium-stabilized circonium oxide.

The present invention also assures a surface in the impingement cooling holes or ducts which has been found to be less prone to attack. The optimally swirled cooling fluid in the air channel nearer the leading edge provides in effect a comparatively large cooling surface area. Moreover, the cooling fluid is admitted at a low pressure as compared to the above prior art air bleeding arrangement.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
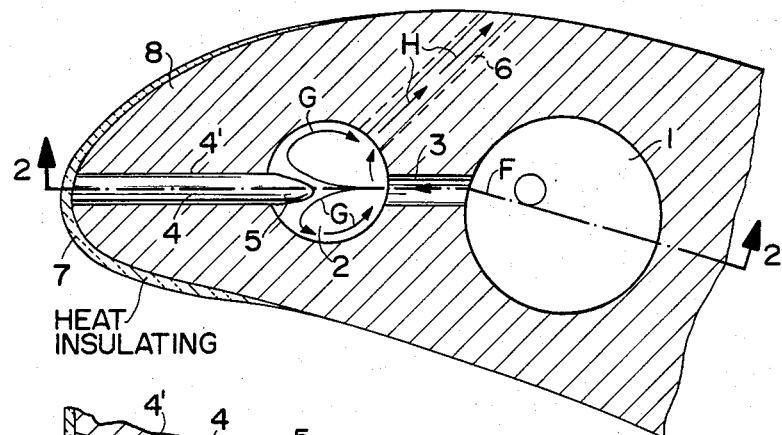
FIG. 1 is a sectional view showing the leading edge and part of a turbine rotor blade of the present invention, whereby the section plane extends perpendicularly to the radial direction of the blade, said radial direction extending perpendicularly to the plane of the drawing.
Figure 2:
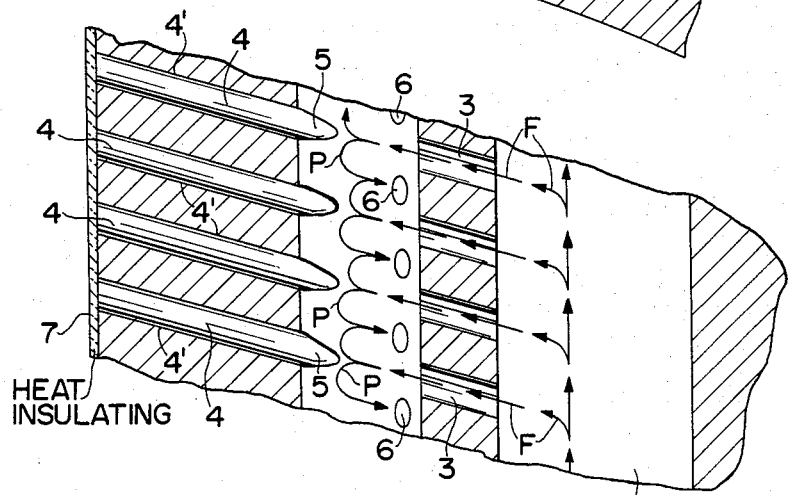
FIG. 2 is a sectional view taken along line 2—2 in FIG. 1.

The turbine rotor blade sections shown in FIGS. 1 and 2 illustrate a first cooling channel 1 extending radially through the blade and communicating with a second radial cooling channel 2 nearer the leading edge 8 of the blade through a row of uniformly vertically arranged or spaced impingement cooling holes or ducts 3. FIG. 1 shows primarily the leading edge area 8 of the blade which is basically a solid section except for the two channels 1 and 2 and the ducts 3. According to the invention the leading edge proper is provided with a row of radially vertically spaced cooling elements 4 in the form of pins or wires 4 arranged in axial alignment with the impingement cooling holes 3 and brazed into holes 4'. The elements 4 have free ends 5 reaching into the cooling channel 2 near the leading edge 8. Preferably, the free end 5 of these elements is tapered and the tip is rounded. The pins or wires 4 are manufactured preferably of a thermally highly conductive material.

Thus, in the present embodiment the cooling fluid such as air flows from the root end of the blade into the air cooling channel 1 and then branches off in the direction of arrow F through the impingement cooling holes or ducts 3 which accelerate the flow of the cooling fluid due to the nozzle effect. When the cooling fluid impinges on the slightly rounded tips of the tapered ends 5 of the pins or wires 4 and due to the above mentioned axial alignment of the ducts 3 and the pins 4, a symmetrical mushroom type configuration of the spacial dispersion of the cooling fluid takes place resulting in a highly intensive spacial whirling motion of the cooling fluid which thus contacts all available surface areas of the pins and cooling channels and is then deflected for recirculation in the direction of arrow P (FIG. 2). Additionally, the cooling fluid is caused to flow along the pins 4 and then along the inner wall of the cooling channel 2 as shown by the arrow G in FIG. 1 until it reaches the slanted, rearwardly directed bleed holes 6 and flows out as indicated by the arrow H. This type of spacial dispersion of the cooling fluid results in an optimal surface contact of the pins 3 and the walls of the cooling channel 2 by the cooling fluid. The flow is then exhausted tangentially along the suction side of the blade.

As it is indicated in FIG. 1 a protective and/or thermally insulating layer 7 may be deposited on the leading edge of the blade by a spraying process.

Although not shown on the drawings, the pins or wires 4 are preferably brazed in place in the respective holes 4' penetrating the leading edge area 8 of the blade using a high temperature brazing allow or hard solder.

Incidentally, the one end, preferably the radially inner end of the first cooling channel 1 is connected to a supply of cooling fluid not shown. The other end is closed in a sealed manner. Both ends of the second cooling channel 2 are sealed.

It is possible to place exit ends of the bleed holes 6 additionally or in the alternative on the pressure side, using suitable tangentially directed holes for discharging cooling fluid flow from the cooling channel 2 along the respective walls of the blade.

If the blade or the blade cooling portion just described is cast as an alternative manufacturing method, it is possible to use the pins or wires 4 as core supports which are allowed to remain in the casting. In this instance the elements 4 would be made of a material having a high melting point and a good heat conductivity such as silicon carbide or beryllium oxide.

Figure 3:
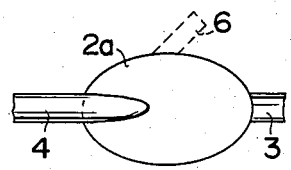
FIGS. 3 to 7 show several different cross-sectional shapes of the second cooling channel near the leading edge of the blade.
Figure 4:
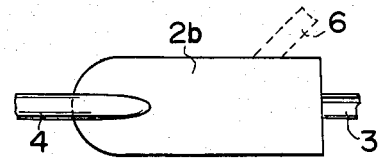
Figure 5:
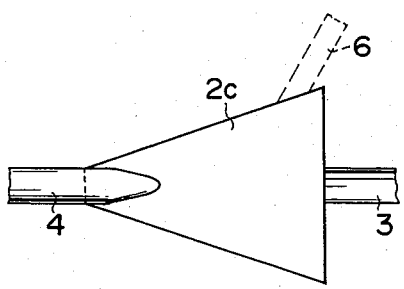
Figure 6:
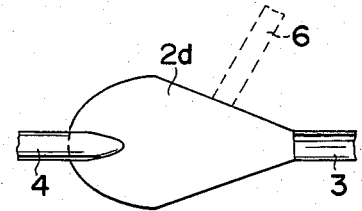
Figure 7:
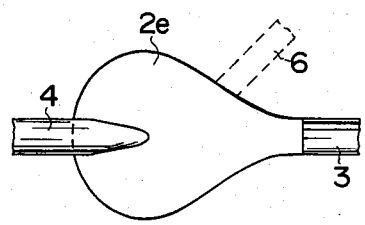

FIGS. 3 to 7 show various cross-sectional configurations for the second cooling channel 2 shown to have a circular cross-section in FIG. 1. In FIG. 3 the channel 2a has an elliptical cross-section. In FIG. 4 the channel 2b has an elongated cross-section with a rounded end portion near the cooling element 4. In FIG. 5 the cooling channel 2c has a cross-section which opens continuously from the cooling pin 4 toward the inlet duct 3 of the cooling medium. In FIG. 6 the cross-sectional shape of the cooling channel 2d has a rounded end portion near the cooling element 4 and a continuously diminishing cross-section toward the duct 3. In FIG. 7 the cross-sectional shape of the cooling channel 2e has the shape of a drop or pair.

Although the invention has been described with reference to specific example embodiments, it will be appreciated, that it is intended to cover all modifications and equivalents within the scope of the appended claims.

What is claimed is:

1. An axial flow turbine blade having a leading edge, comprising a first cooling fluid flow channel (1) extending substantially radially in the blade for supplying a cooling fluid into the blade, a second cooling fluid flow channel (2) also extending substantially radially in the blade between said first channel (1) and said leading edge for cooling especially said leading edge, a plurality of impingement ducts (3), each duct having a first longitudinal axis and interconnecting said first channel (1) with said second channel (2) for supplying cooling fluid from said first channel (1) into said second channel (2) through said ducts (3), whereby cooling fluid is projected into said second channel, a plurality of elongated cooling pins (4) of heat conducting material extending through the blade substantially from said leading edge and into said second chamber (2), each of said cooling pins (4) having a second longitudinal axis extending in axial alignment with the respective first longitudinal axis, each of said cooling pins (4) further having a free end reaching into said second channel (2) in the direction of said first and second longitudinal axes so that cooling fluid from said ducts (3) is aimed to axially impinge on said free ends of said cooling pins (4) for causing a symmetrical spacial dispersion of the cooling fluid enabling the cooling fluid to contact all surface areas of said cooling pins and of said second channel for an improved cooling action, at least said second channel (2) having wall surfaces positioned for deflecting the spacially dispersed cooling fluid, and further duct means (6) extending out of said second channel (2) for discharging cooling fluid out of said blade.

2. The turbine blade of claim 1, wherein said free ends (5) of said cooling pins (4) are shaped to have a substantially conical tip for dividing cooling fluid.

3. The turbine blade of claim 2, wherein said conical tip of said pins is slightly rounded for causing a highly turbulent scattered recirculation flow of the cooling fluid.

4. The turbine blade of claim 1, further comprising a protective layer (7) applied to said leading edge.

5. The turbine blade of claim 4, wherein said protective layer is also a heat insulating layer.

6. The turbine blade of claim 1, wherein said cooling pins (4) are held in place in respective bores in the turbine between the leading edge and the second channel by a high temperature solder, especially a high temperature hard solder.

7. The turbine blade of claim 1, wherein said first longitudinal axes of said ducts (3) and said second longitudinal axis of said cooling pins (4), which axes coincide with each other, substantially intersect a longitudinal central axis of the second channel (2).

8. The turbine blade of claim 1, wherein said second channel (2) has a circular cross-section.

9. The turbine blade of claim 1, wherein said second channel (2) has an elliptical cross-section.

10. The turbine blade of claim 1, wherein said second channel (2) has an elongated cross-sectional shape with a rounded end.

11. The turbine blade of claim 1, wherein said second channel (2) has a cross-section which widens continuously toward said impingement ducts (3) from said cooling pins (4).

12. The turbine blade of claim 1, wherein said second channel (2) has a cross-section which narrows toward said impingement ducts (3).

13. The turbine blade of claim 1, wherein said second channel (2) has a drop shaped cross-section.

* * * * *